Jan. 16, 1951 W. F. BONNER 2,537,961
RECTIFIER
Filed Aug. 7, 1947 2 Sheets-Sheet 1
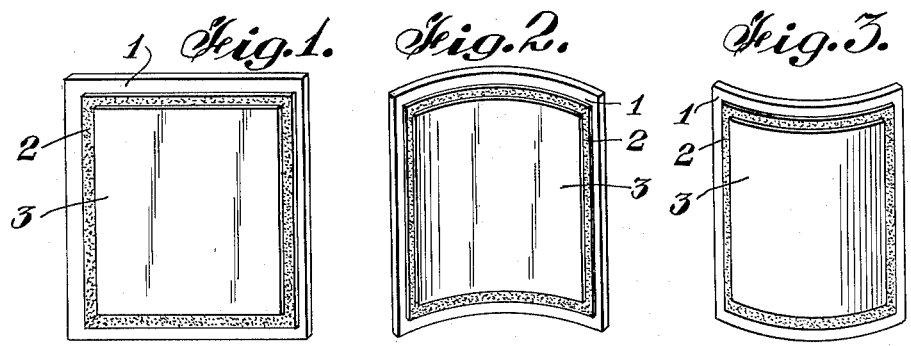
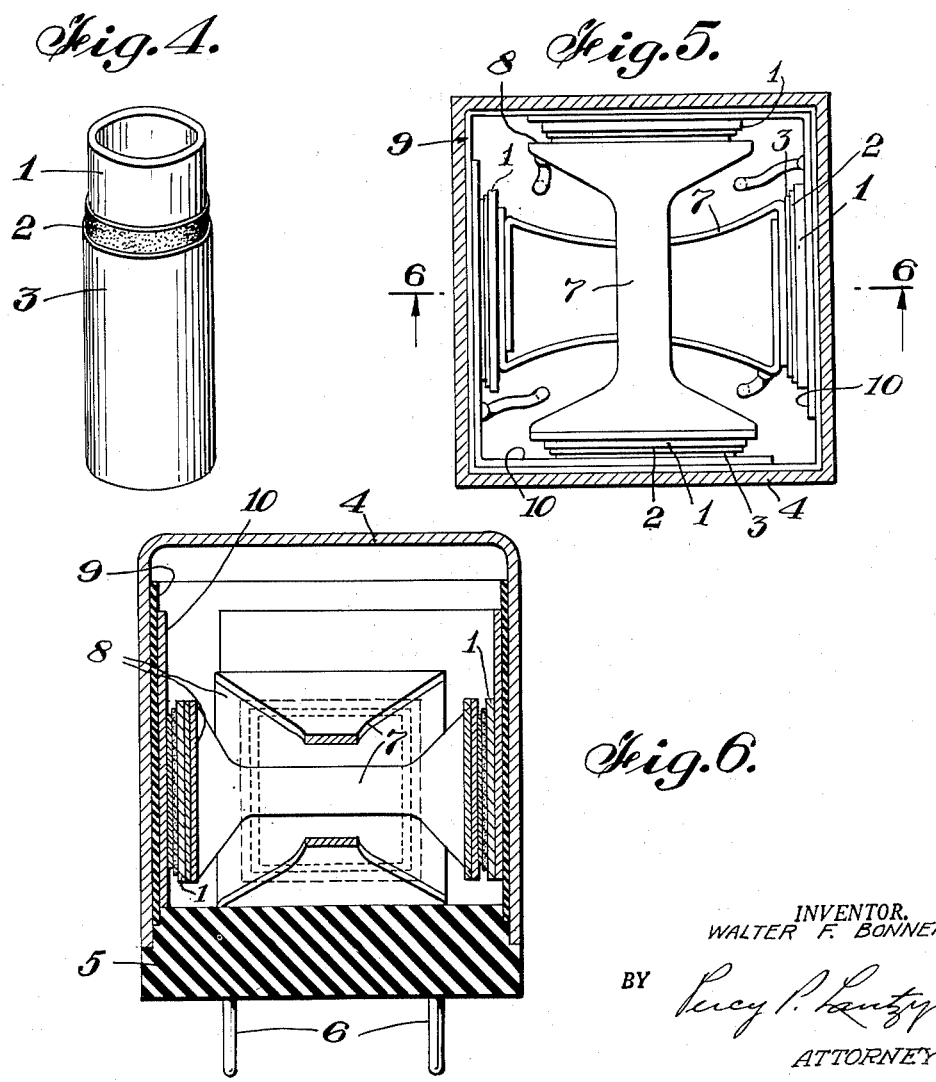
INVENTOR.
WALTER F. BONNER
BY
ATTORNEY Jan. 16, 1951 W. F. BONNER 2,537,961
RECTIFIER
Filed Aug. 7, 1947 2 Sheets-Sheet 2

INVENTOR.
WALTER F. BONNER
BY
*Percy P. Lantz*
ATTORNEY

Patented Jan. 16, 1951

2,537,961

UNITED STATES PATENT OFFICE 2,537,961

RECTIFIER

Walter F. Bonner, Glen Ridge, N. J., assignor to Federal Telephone and Radio Corporation, New York, N. Y., a corporation of Delaware Application August 7, 1947, Serial No. 767,298

5 Claims. (Cl. 175—366)

My invention relates to rectifiers and is particularly directed to improvements in unitary essemblies of rectifiers of the dry-plate semi-conductor type.

The semi-conductor rectifier element contemplated here may include the type comprising a sheet of metal covered with a layer of semi-conducting material, such as selenium, which in turn is coated with a counter-electrode, or the type comprising a rod or tubular base metal electroplated or otherwise coated with first a layer of semi-conducting material and second with a layer of a counterelectrode material.

An object of my invention is to provide improved means for assembling, and mechanically protecting a plurality of such semi-conductor rectifier elements.

Another object is to provide an improved unitary assembly of rectifier elements, of the semiconductor type, that is adapted for easy arrangement of the elements and their electrical connections, that is adapted for housing in an envelope with a maximum heat conduction to and through the walls of the envelope, and that is adapted in service for plug-in replacement.

The scope of my invention is defined in the appended claims, and preferred embodiments are described in the following specification in connection with the accompanying drawing, in which:

Figs. 1, 2, 3 and 4 are perspective views of rectifier elements of the general configuration to be used in my novel assembly;

Fig. 5 is a plan view, in section, of one rectifier assembly of my invention;

Fig. 6 is an elevational view on the section line 6—6 of Fig. 5;

Figure 7:
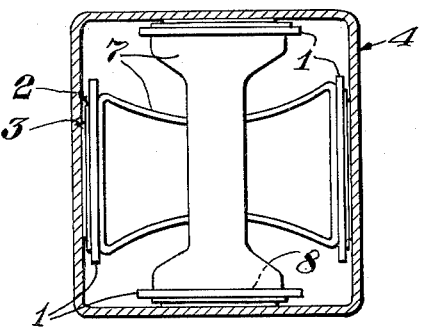
Figs. 7 and 8 are plan views, in half section, of rectifier assemblies of my invention.

The rectifier element contemplated in my novel rectifier assembly comprises, generally, a base metal 1 either in sheet, rod or tubular form having a surface composition suitable as the base for semi-conducting materials. The semi-conductor layer 2, which may comprise metallic selenium or other semi-conductive material may be applied to the base metal by any of the known processes such as the electroplating, vaporizing or powder processes. The counter-electrode 3 may comprise an alloy or other metallic composition coated onto the semi-conductive layer either by spraying or dipping. Such a rectifier element, with terminals connected to the alloy and to the base metal, respectively, exhibits unidirectional current carrying characteristics and is well adapted for rectifying service in power supplies for radio apparatus and the like.

It will appear hereinafter that the planar rectifying element of Fig. 1 may be concaved as suggested in Fig. 2, or convexed as in Fig. 3, or, in fact rolled into a closed cylinder as shown in Fig. 4, with the semi-conducting and counterelectrode layers, 2 and 3, applied to the exterior thereof. The base plate or sheet may be curved to the desired shape either before or after the applications of the semi-conducting and counterelectrode layers. It will also be understood that the rectifier may be tubular or rod-shaped depending on the shape of the base metal, as indicated by rod rectifiers in Figs. 9 and 10.

The envelope 4 of Fig. 5 and Fig. 6 in which may be assembled four of the planar rectifier elements, is rectangular in horizontal cross section. The bottom end of the envelope is closed and preferably sealed with a flat header 5 carrying a number of contact pins 6. The size of the pins and the spacing thereof may be so selected that standard radio tube sockets may receive the pins. Flat rectifier elements are placed against the side walls of the envelope and are yieldingly but firmly held in place by spring braces. Each brace consists of a stamping of springy metal, such as phosphor-bronze or steel, with two curved legs 7 joining the end platforms 8. By squeezing the legs together the end platforms may be drawn in slightly to release the pressure on the rectifier elements. The parts are dimensioned so that the brace legs are nearly straight when in position in the envelope to give the legs considerable mechanical advantage in holding the rectifier elements in place. Where it is desired that all rectifiers be placed equal distances from the header, the legs of the braces may be crossed and interleaved as shown. The pressure contact between the rectifier elements and the envelope wall insure good heat transmission to the wall and, hence, good cooling of the elements in operation. The envelope may be filled with oil for better cooling and for minimizing local hot-spots.

Various electrical connections and combinations of connections may be made in the rectifier elements of the assembly of Fig. 5, a four-sided bridge for full-wave rectification being shown. The polarity of any rectifier element in the assembly may be reversed merely by turning the element in the housing so that either the counterelectrode or the base metal, as desired, contacts the platform 8. Where the envelope is of metal and where both sides of the element must be insulated from the envelope, a sheet of insulating paper 9 is sandwiched between the rectifier element and the envelope wall. Further, where two adjacent elements are to be connected to a common terminal as in Fig. 5, the thin metal sheet 10 is laid on the insulating sheet, is formed around the corner of the envelope, and is clamped under the two desired rectifier elements. The two thin metal sheets, and the two braces may constitute, electrically, the four corners of the bridge circuit of Fig. 12 and may be connected to four contact pins in the header.

Other electrical arrangements of the rectifier elements are easily made. If all the elements are to be operated in parallel as in Fig. 11, the insulating sheet and the metal sheet may be extended all the way around the inner envelope wall and one lead and contact pin connected to the sheet, and a separate lead and pin connected to the two braces.

One common connection to the rectifier elements for parallel operation may be made through the envelope wall if desired. As shown in Fig. 7, the counterelectrode 3, or the base plate 1 if desired, of each rectifier element is placed directly against the inside of the metal envelope wall. When such parallel connections are made, the envelope should be electrically grounded.

Figure 8:
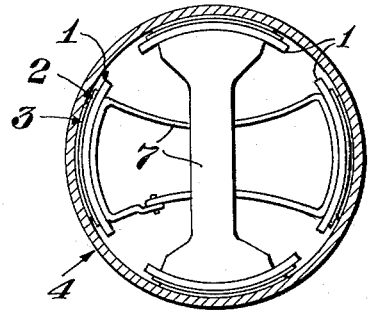

The rectifier assembly of my invention is also well adapted for the round envelope of Fig. 8. Here, the rectifier elements and the platform of the braces are shaped, as with a die press, to the curvature of the envelope wall, and where the envelope is metal, as drawn steel, the rectifier elements may be placed directly in contact with the envelope, or insulated therefrom, as in Fig. 5. If insulation is desired, the envelope may be made of insulation such, for example, as glass, molded insulating compounds, etc. For a full-wave bridge circuit, two elements in each assembly are concaved as shown in Fig. 2, and two are convexed as shown in Fig. 3, unlike elements being placed at opposite ends of each brace. The diameter and length of the envelope and the dimensions of the rectifier elements are easily selected for the particular current capacity desired for the assembly.

Figure 9:
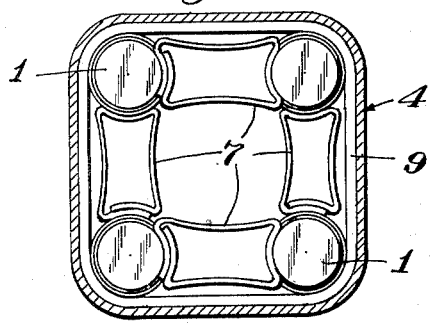
Fig. 9 is a plan view, partly in section, of still another rectifier assembly of my invention.
Figure 10:
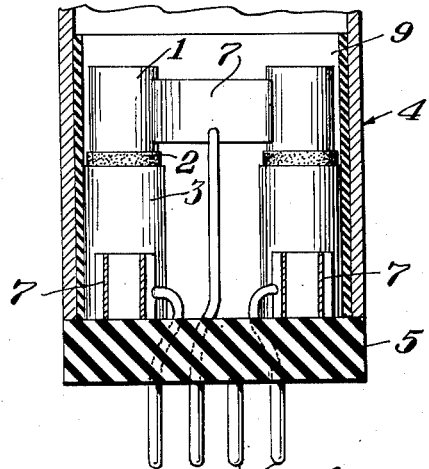
Fig. 10 is a section, on line 10—10 of Fig. 9.
Figure 11:
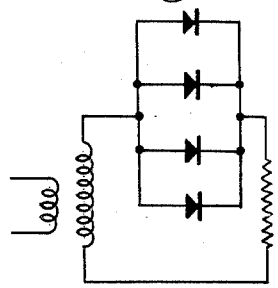
Figs. 11, 12 and 13 are circuit diagrams showing a few illustrative connections of the many that may be made with the rectifier elements of my novel assemblies.
Figure 12:
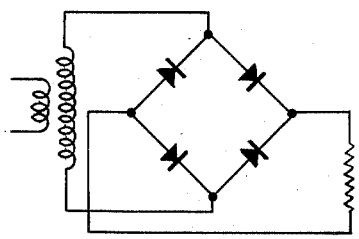
Figure 13:
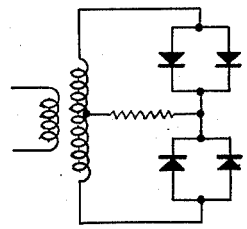

A still further adaptation of my novel rectifier assembly is shown in Figs. 9 and 10. The rectifier elements here are of the cylindrical type either rod or tubular, such as mentioned above. The semi-conducting layer 2 and the counterelectrode alloy coating 3 are terminated short of one end of the cylinder 1, as better shown in Figs. 4 and 10, so that the exposed end of the cylinder, and the alloy coating constitute, respectively, the two electrical terminals of the rectifier element. Four such elements are stood in the four corners, either curved or sharply rectangular, of a rectangular envelope and the spring braces are placed between each pair of adjacent rectifier cylinder elements. The braces 7—8 are narrow so that they may bear against the terminal ends only of the cylinders. Other forms of braces may, of course, be employed. A single brace, metallic or of insulating material, may be so shaped as to contact all of the rectifiers and urge them against the walls of the envelope. For example, a brace may be in the form of a helix or split ring. By properly orienting the cylinders, end-for-end, any desired combination of rectifier polarities may be selected, and parallel, bridge, or push-pull operation as indicated in Figs. 11, 12, and 13, respectively, may be obtained. In Figs. 9 and 10, each of the four braces are connected through a separate lead wire to a separate contact pin, each rectifier element being electrically spaced from the envelope wall by a sheet of insulating material. Here, again, the envelope may be filled with oil or other fluid for better heat distribution and cooling. The envelope of Figs. 9 and 10 may also be of glass or other insulating material in which case insulating layer 9 may be omitted.

The rectifier elements and their electrical connections of my novel assembly are easily arranged for various services and the elements may be satisfactorily housed in an envelope with a base and contact pins for plug-in uses.

I claim:

1. A rectifier assembly comprising an envelope having a curved internal surface, a plurality of curved rectifying elements of the semi-conducting type disposed therein, resilient means to press each of said curved elements against correspondingly curved portions of the wall of said envelope and hold the curved elements in place within the envelope, and lead-in conductors for at least certain of said rectifier elements extending through said envelope.

2. A rectifier assembly according to claim 1, wherein said rectifying elements are cylindrical and said wall portions are curved to contact a substantial portion of the curved surface of each cylindrical element.

3. A rectifier assembly comprising a plurality of sheet-like rectifier elements of the semi-conductor type, a metal envelope closed with a header, contact pins carried by said header, braces of resilient metal inside and extending diametrically across said envelope, rectifier elements yieldingly retained between the ends of said braces and the inner surface of said envelope, and electrical connections between said braces and pins.

4. A rectifier assembly comprising an envelope, a plurality of rectifier elements of the semi-conductor type within and spaced about the envelope, and a brace including a resilient part bearing in opposed direction against two of said rectifier elements.

5. A rectifier assembly comprising an envelope, a rectifier element inside said envelope, a brace inside and extending across said envelope, said brace consisting of a strip of springy metal with a leg portion and a platform portion at the end of the leg portion, said element being yieldingly held between the envelope wall and the platform portion of said brace, and said leg portion being adapted to be flexed to release said element.

WALTER F. BONNER.

REFERENCES CITED

The following references are of record in the file of this patent:

UNITED STATES PATENTS

| Number | Name | Date |
|---|---|---|
| 1,728,537 | Geiger | Sept. 17, 1929 |
| 2,215,667 | Sherman | Sept. 24, 1940 |
| 2,353,461 | Hamann | July 11, 1944 |
| 2,412,989 | Kotterman | Dec. 24, 1946 |